United States Patent
Sakamoto et al.

(10) Patent No.: US 10,720,699 B1
(45) Date of Patent: Jul. 21, 2020

(54) BASE STATION AND ANTENNA CONTROL METHOD

(71) Applicant: Panasonic Corporation, Osaka (JP)

(72) Inventors: Takenori Sakamoto, Kanagawa (JP); Hiroyuki Motozuka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 16/210,018

(22) Filed: Dec. 5, 2018

Related U.S. Application Data (60) Provisional application No. 62/610,816, filed on Dec. 27, 2017.

(30) Foreign Application Priority Data

Mar. 14, 2018 (JP) .................................. 2018-046744

(51) Int. Cl.
*H01Q 3/04* (2006.01)
*H01Q 1/28* (2006.01)
*H04W 88/08* (2009.01)

(52) U.S. Cl.
CPC ................. *H01Q 3/04* (2013.01); *H01Q 1/28* (2013.01); *H04W 88/08* (2013.01)

(58) Field of Classification Search
CPC .. H01Q 3/00; H01Q 3/02; H01Q 3/04; H01Q 1/28; H04B 7/06; H04B 7/08; H04B 7/26; H04B 17/00
See application file for complete search history.

(56) References Cited

U.S. PATENT DOCUMENTS

| 2010/0009636 A1* | 1/2010 | Hasegawa | H04L 1/0015 455/67.11 |
| 2010/0291918 A1* | 11/2010 | Suzuki | H04W 88/06 455/422.1 |
| 2012/0002742 A1* | 1/2012 | Cheng | H04B 7/024 375/267 |
| 2013/0155979 A1* | 6/2013 | Satapathy | H04W 72/042 370/329 |

FOREIGN PATENT DOCUMENTS

| JP | 2003-273631 | 9/2003 |
| JP | 2010-166316 | 7/2010 |
| JP | 2016-140027 | 8/2016 |

OTHER PUBLICATIONS

P. F. Driessen et al., "On the Capacity Formula for Multiple Input-Multiple Output Wireless Channels: A Geometric Interpretation", IEEE Transactions on Communications, vol. 47, No. 2, pp. 173-176, Feb. 1999.

* cited by examiner

*Primary Examiner* — Hoang V Nguyen
(74) *Attorney, Agent, or Firm* — Seed IP Law Group LLP (57) ABSTRACT

Based on information indicating a direction of movement of a mobile station, a base station rotates a direction of a set of a first antenna and a second antenna disposed on the base station with respect to a direction of a set of a third antenna and a fourth antenna disposed on the mobile station, the third antenna and fourth antenna being symmetric with respect to a direction of movement of the mobile station.

10 Claims, 9 Drawing Sheets

BASE STATION AND ANTENNA CONTROL METHOD

BACKGROUND

1. Technical Field

The present disclosure relates to a base station and an antenna control method.

2. Description of the Related Art

A MIMO (Multiple-Input and Multiple-Output) transmission technique has been used for NLOS (Non-Line of Sight) communication.

In a case where an antenna interval is set to be greater than a wavelength, it is possible to increase the communication channel capacity in the MIMO transmission depending on the number of antennas even in LOS (Line of Sight) communication (for example, see P. F. Driessen and G. J. Foschini, "On the capacity formula for multiple input-multiple output wireless channels: a geometric interpretation", IEEE Trans. Comm., vol. 47, no.2, pp. 41-59, Autumn 1966). The "communication channel" is also referred to as "transmission channel", a "propagation channel", or a "channel". Hereinafter, "line-of-sight MIMO" will be referred as "LOS-MIMO".

In a satellite communication technique, to capture a satellite, it is known to control an antenna direction by controlling, based on a level of a received signal, a rotation angle (an azimuth angle, an angle of elevation, and a polarization angle) of an antenna itself installed in a base station located on Earth (for example, see Japanese Unexamined Patent Application Publication No. 2003-273631).

SUMMARY

When it is attempted to apply the LOS-MIMO transmission technique to a wireless communication between a base station (a base station apparatus) and a mobile station (a mobile terminal apparatus), a reduction can occur in a channel capacity owing to a rotation of a channel phase between a base station antenna and a mobile station antenna depending on movement of the mobile station.

One non-limiting and exemplary embodiment provides a base station and an antenna control method, capable of suppressing a reduction in a channel capacity between a base station antenna and a mobile station antenna depending on movement of the mobile station.

In one general aspect, the techniques disclosed here feature a base station including a first antenna and a second antenna disposed at locations symmetric with respect to a symmetry axis, and an antenna rotation mechanism that rotates, based on information indicating a direction of movement of a mobile station, a direction of a set of the first antenna and the second antenna with respect to a direction of a set of a third antenna and a fourth antenna disposed on the mobile station, the third antenna and the fourth antenna being at locations symmetric with respect to the direction of movement of the mobile station.

According to the aspect of the present disclosure, it is possible to suppress a reduction in a channel capacity between a base station antenna and a mobile station antenna depending on movement of the mobile station.

It should be noted that general or specific embodiments may be implemented as a system, a method, an integrated circle, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described in detail below referring to drawings as required. However, unnecessarily too detailed descriptions will be omitted. For example, a detailed description of an already well-known item or a duplicated description of an element or a process substantially the same as an element or a process already described will be omitted, which will prevent the following description from being too redundant and which will make it possible for the following description to be more easily understood.

Note that the accompanying drawings and the following description are provided for illustration purposes only but not for limitation.

In the LOS-MIMO transmission technique disclosed in P. F. Driessen and G. J. Foschini, "On the capacity formula for multiple input-multiple output wireless channels: a geometric interpretation", IEEE Trans. Comm., vol. 47, no.2, pp. 41-59, Autumn 1966, a phase rotation (phase difference) $\theta_{ik}$ of a channel from an i-th transmitting antenna to a k-th receiving antenna is represented by a formula (1) described below.

$$\theta_{ik} = \frac{\pi}{n}(i-k)^2 \qquad (1)$$

A transmission model will be discussed below for a case where two transmitting antennas are provided in a base station, and two receiving antennas are provided in a mobile station.

In the line-of-sight mobile communication, the communication distance between the base station and the mobile station (in other words, the propagation circumstance) may change from every moment.

To satisfy formula (1) in a situation in which the propagation circumstance changes, for example, an antenna position (for example, a transmitting antenna position) at the base station and an antenna position (for example, a receiving antenna position) at the mobile station are controlled based a positional relationship between the base station and the mobile station. Parameters related to the antenna position include, for example, an antenna interval and an orientation of antennas (also referred to as an "antenna direction").

Controlling the antenna interval is generally more difficult than controlling the antenna direction, and thus the following discussion will focus on the controlling of the antenna direction.

In the LOS-MIMO transmission, in the case where the number of antennas and the number of receiving antennas are both equal to two, for example, when the positions of the two receiving antennas change with respect to the positions of the two transmitting antennas, there can be a situation in which $\theta_{ik}$ in formula (1) meets the following condition: $\theta_{11}=\theta_{21}$ and $\theta_{12}=\theta_{22}$.

For example, when an angle between a straight line connecting the two transmitting antennas and a straight line connecting the two receiving antennas is equal to 90°, $\theta_{11}=\theta_{21}$ and $\theta_{12}=\theta_{22}$ are satisfied.

In this case, the average transmission capacity achieved between the two transmitting antennas and the two receiving antennas is, substantially, at most, a channel capacity achieved by a SISO (Single-Input and Single-Output) technique.

When $\theta_{11}=\theta_{21}$ and $\theta_{12}=\theta_{22}$ are satisfied, the path length difference between two signals (streams) transmitted from the two transmitting antennas and arrived at the one receiving antenna does not change even if the antenna themselves are rotated, for example, in a manner as described in P. F. Driessen and G. J. Foschini, "On the capacity formula for multiple input-multiple output wireless channels: a geometric interpretation", IEEE Trans. Comm., vol. 47, no.2, pp. 41-59, Autumn 1966. Therefore, no change occurs also in the phase rotation $\theta_{ik}$ of the channel between the antennas, and it is difficult to achieve an improvement in channel capacity.

The following description provides an example of a technique of suppressing a reduction in channel capacity between base station antennas and mobile station antennas, due to a movement of a mobile station, in LOS-MIMO transmission between a base station and a mobile station.

In the following description, the terms " . . . unit" used to describe constituent elements of the base station 100 and the mobile station 200, such as " . . . circuit", " . . . device", " . . . module", or the like may be replaced with equivalent other expressions.

Figure 1:
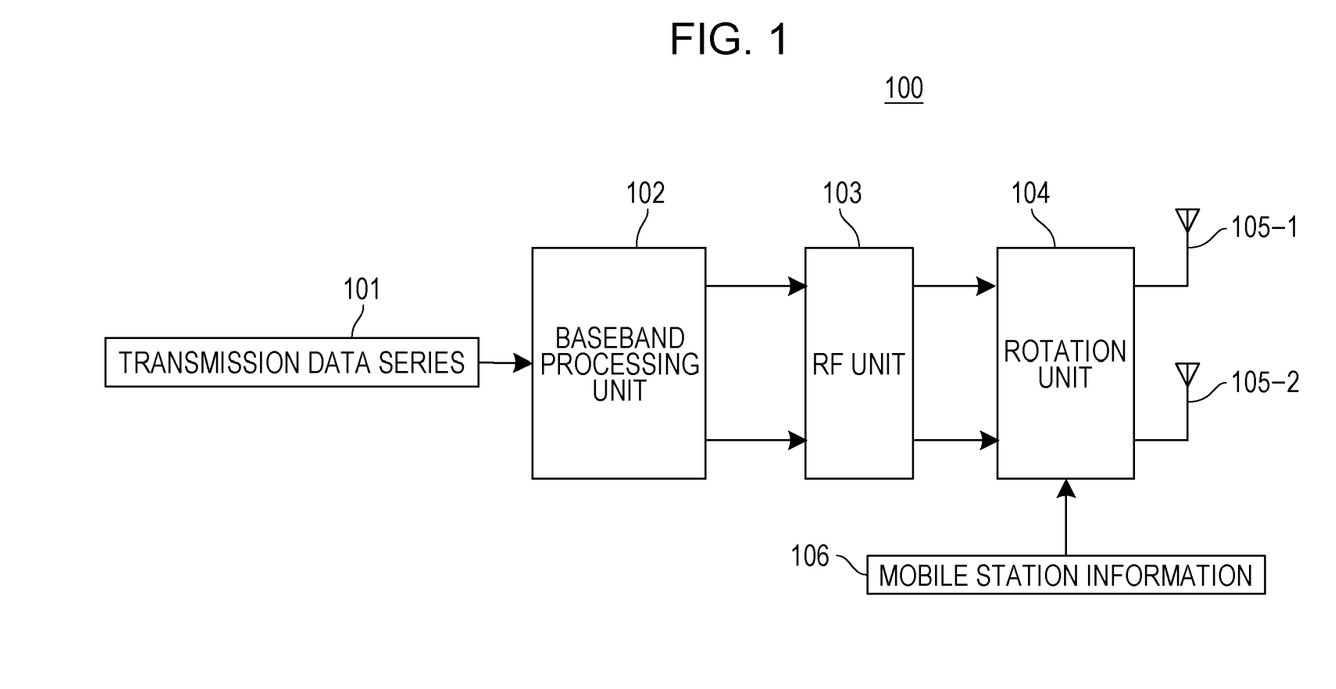
FIG. 1 is a diagram illustrating an example of a configuration of a base station according to an embodiment.

FIG. 1 is a diagram illustrating an example of a configuration of the base station 100 according to an embodiment. The base station 100 includes, for example, a baseband processing unit 102, an RF unit 103, a rotation unit 104, and two transmitting antennas 105-1 and 105-2.

The baseband processing unit (processing circuit) 102 performs baseband (BB) signal processing on a transmission data series 101. The BB signal processing may include, by way of example, a scrambling process, an error correction coding process, a stream dividing process, a constellation mapping process, an interleaving process, a precoding process, a pulse shaping process, and a digital-analog (DA) conversion process.

The RF unit (RF circuit) 103 performs, for example, a frequency conversion process, a quadrature modulation process, an analog beamforming process, and an amplification process, on a signal output from the baseband processing unit 102.

Figure 2:
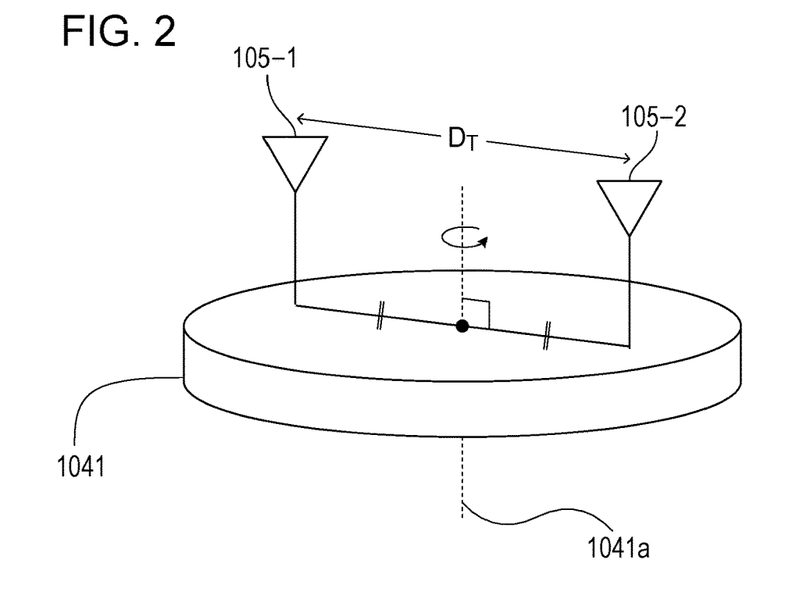
FIG. 2 is a diagram illustrating an example of a configuration of the rotation unit shown in FIG. 1.

The rotation unit 104 is an example of an antenna rotation mechanism, and includes a disk-shaped rotary unit 1041 as shown, for example, in FIG. 2. The rotary unit 1041 is rotatable in a horizontal plane over 360° about a rotation axis 1041a located in the center of the rotary unit 1041 as seen in plan view.

The transmitting antennas 105-1 and 105-2 are fixed to one of surfaces of the rotary unit 1041. The transmitting antennas 105-1 and 105-2 are located at positions apart in a radial direction by an equal distance ($D_T/2$) from the center of the disk as shown in FIG. 2.

In other words, the transmitting antennas 105-1 and 105-2 are disposed on the rotary unit 1041 at symmetric positions with respect to a symmetry axis given by a line (perpendicular bisector) passing through the center of a line segment connecting the transmitting antennas 105-1 and 105-2.

Therefore, the distance between the transmitting antenna 105-1 and the transmitting antenna 105-2 is equal to $D_T$. The symmetry axis between the transmitting antennas 105-1 and 105-2 functions as the rotation axis 1041a about which the transmitting antennas 105-1 and 105-2 are rotatable.

The rotary unit 1041 may be allowed to be rotated in one rotation direction, or the rotation direction may be switched between a forward direction and a reverse direction. The rotary unit 1041 may be driven to rotate, for example, by a drive circuit including a motor etc. (not illustrated). The driving of the rotation of the rotary unit 1041 may be controlled, for example, based on mobile station information 106 acquired at the base station 100. Note that the rotation unit 104 may electronically rotate the set of transmitting antennas 105-1 and 105-2 as will be described later.

The mobile station information 106 may be received from the mobile station 200, for example, via wireless communication between the base station 100 and the mobile station 200 (see FIG. 3), or the mobile station information 106 may be received from a device that is different from the base station 100 and that communicates with the mobile station 200.

The mobile station information 106 may include, for example, position information (for example, a latitude, a longitude, and an altitude) of the mobile station 200, a traveling (moving) direction (an azimuth angle) of the mobile station 200, a moving speed of the mobile station 200, an inclination (a roll angle, a yaw angle, and a pitch angle) of the mobile station 200, and a channel estimation value between the base station 100 and the mobile station 200.

The mobile station 200 may be a flying object such as an aircraft, a helicopter, a drone, or the like. Two receiving antennas may be provided on the flying object as described later. In a case where the mobile station 200 is an aircraft, operation information associated with the aircraft may be given as mobile station information 106 to the base station 200.

The operation information may include flight information indicating scheduled flight time and flight route for each aircraft. It is possible to determine, from the flight information, the direction of traveling of the aircraft with respect to the base station 100.

An output signal from the RF unit 103, that is, a radio signal, is radiated from the transmitting antennas 105-1 and 105-2 toward the mobile station 200.

Figure 3:
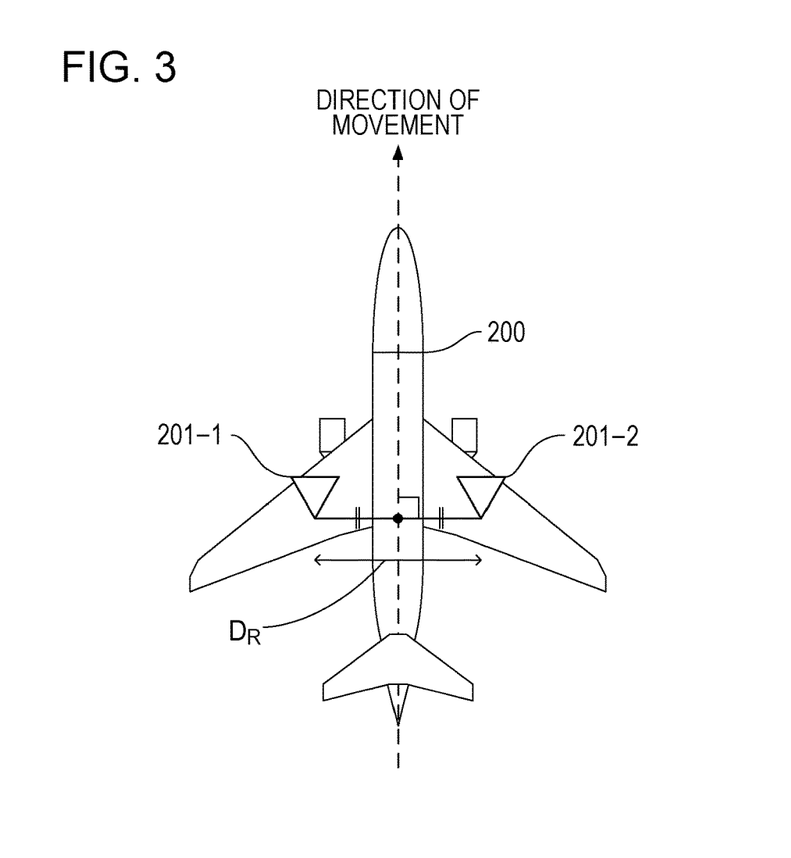
FIG. 3 is a diagram illustrating an example of a manner in which antennas are disposed on a mobile station according to an embodiment.

FIG. 3 is a diagram illustrating an example of a manner in which the receiving antennas 201-1 and 201-2 are disposed on the mobile station 200.

The receiving antenna 201-1 and the receiving antenna 201-2 are installed on the mobile station 200, for example, such that the direction of a perpendicular bisector (a symmetry axis) of a line segment connecting the receiving antenna 201-1 and the receiving antenna 201-2 is coincident with the direction of movement of the mobile station 200 and such that the receiving antenna 201-1 and the receiving antenna 201-2 are at locations symmetric about the symmetry axis described above. The distance between the receiving antenna 201-1 and the receiving antenna 201-2 is equal to, for example, $D_R$.

The base station 100 may include, in addition to or instead of the transmitting antennas 105-1 and 105-2, two receiving antennas corresponding to the receiving antennas 201-1 and 201-2 illustrated by way of example in FIG. 3. The mobile station 200 may include, in addition to or instead of the receiving antennas 201-1 and 201-2, two receiving antennas corresponding to the transmitting antennas 105-1 and 105-2 illustrated by way of example in FIG. 1 and FIG. 2.

In other words, the wireless communication between the base station 100 and the mobile station 200 may be unidirectional or bidirectional. The mechanism (for example, the rotation unit 104) that rotates the transmitting antennas 105-1 and 105-2 may be applied to the rotation of the receiving antennas 201-1 and 201-2.

Using the configuration described above, LOS-MIMO transmission is performed between the base station 100 and the mobile station 200. For example, data may be transmitted using LOS-MIMO between the base station 100 and the mobile station 200 which may be a flying object such as an aircraft. The data may include at least one of moving image (video) data, still image (picture) data, text data, voice/sound data, and control data.

Example of Method of Controlling Rotation Unit

Figure 4:
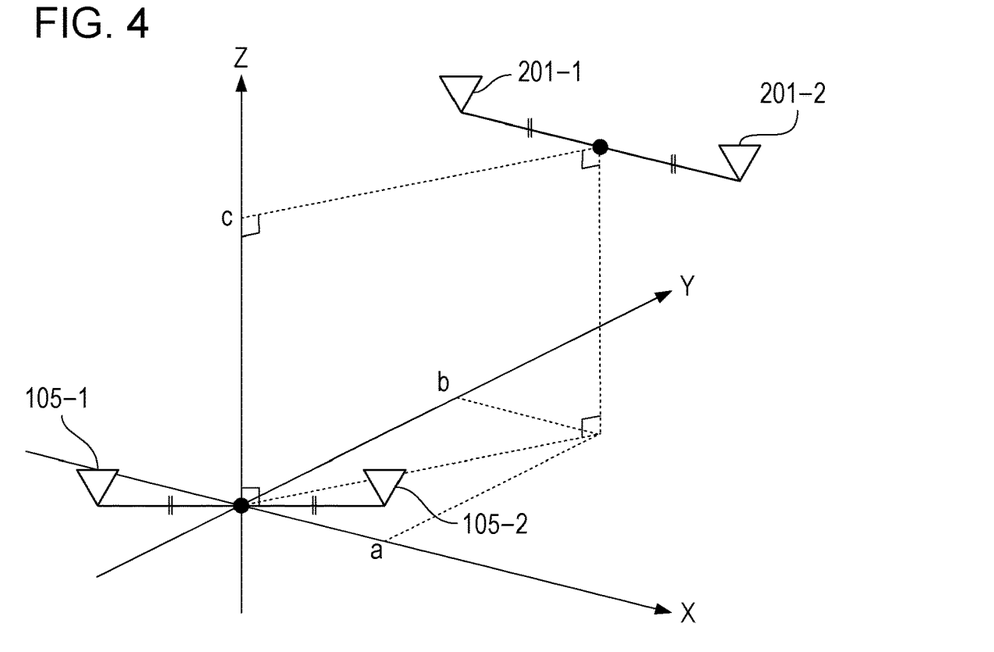
FIG. 4 is a diagram illustrating an example of a LOS-MIMO transmission model between a base station and a mobile station according to an embodiment.

Next, a method of controlling the rotation angle of the rotation unit 104 is described. FIG. 4 is a diagram illustrating an example of a LOS-MIMO transmission model according to an embodiment. In FIG. 4, the base station 100 is disposed, for example, such that the center point of the line segment connecting the transmitting antennas 105-1 and 105-2 is coincident with an origin of a 3-dimensional orthogonal coordinate system. That is, the center point between the transmitting antennas 105-1 and 105-2 is at coordinates (x, y, z)=(0, 0, 0).

Figure 5:
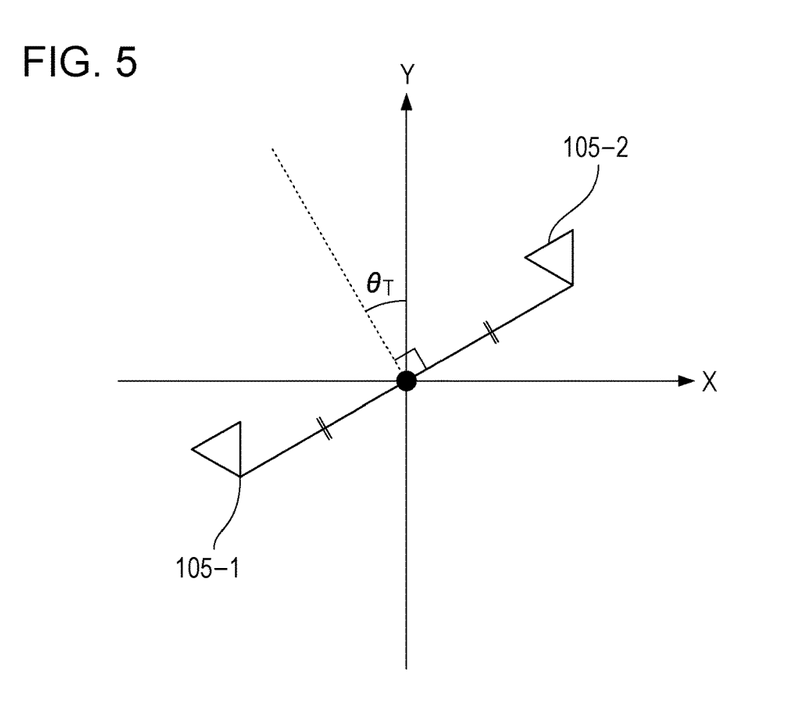
FIG. 5 is a diagram illustrating a definition of an antenna azimuth angle ($\theta_T$) of a base station according to an embodiment.

The transmitting antennas 105-1 and 105-2 are rotatable, for example, in a horizontal plane (an XY-plane) about a Z-axis corresponding to the center axis 104a shown in FIG. 2. Herein, for example, as shown in FIG. 5, an angle made by a perpendicular bisector, in the XY-plane, of the line segment connecting the transmitting antennas 105-1 and 105-2 with respect to the Y-axis is defined as an azimuth angle $\theta_T$.

Hereinafter, the azimuth angle $\theta_T$ will also be referred to as an "antenna azimuth angle $\theta_T$" or a "transmitting antenna azimuth angle $\theta_T$". In the embodiment, the transmitting antenna azimuth angle $\theta_T$ may take a value in a range from $-180° \leq \theta_T < +180°$.

On the other hand, the location of the center point between the receiving antennas 201-1 and 201-2 on the mobile station 200 is represented by coordinates (x, y, z)=(a, b, c). Therefore, coordinates (a, b, c) represent a relative position of the mobile station 200 as seen from the base station 100.

Furthermore, it is assumed that the mobile station 200 moves in a direction parallel to the Y-axis while maintaining its altitude at z=c. Therefore, when an angle made by the direction of the movement of the mobile station 200 with respect to the Y-axis in the XY-plane is defined as an azimuth angle $\theta_R$ of the receiving antennas 201-1 and 202-2, the mobile station 200 moves while maintaining the azimuth angle at $\theta_R = 0°$ in the LOS-MIMO transmission model shown in FIG. 4. Hereinafter, the azimuth angle $\theta_R$ will also be referred to as "antenna azimuth angle $\theta_R$" or a "receiving antenna azimuth angle $\theta_R$".

In the embodiment, for example, c=10000 m (meters), and a range within which the mobile station 200 is allowed to move is given by $-10000 \text{ m} \leq a \leq +10000 \text{ m}$ and $-10000 \text{ m} \leq b \leq +10000 \text{ m}$. The antenna interval $D_T$ between the transmitting antenna 105-1 and transmitting antenna 105-2 and the antenna interval $D_R$ between the receiving antenna 201-1 and the receiving antenna 201-2 are represented by formula (2) as shown below.

$$D_T = D_R = \sqrt{\frac{\lambda c}{2}} \qquad (2)$$

where $\lambda$ denotes a wavelength of a carrier. For example, the wavelength is $\lambda = 1$ mm in a terahertz band.

Figure 6A:
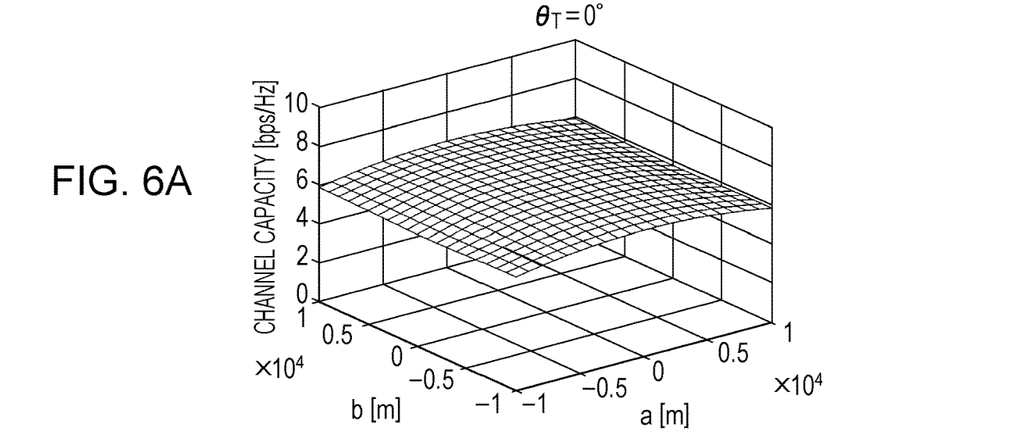
FIG. 6A is a diagram illustrating an example of a per-stream average channel capacity at a location of a mobile station when an antenna azimuth angle ($\theta_T$) of a base station is 0° according to an embodiment.
Figure 6B:
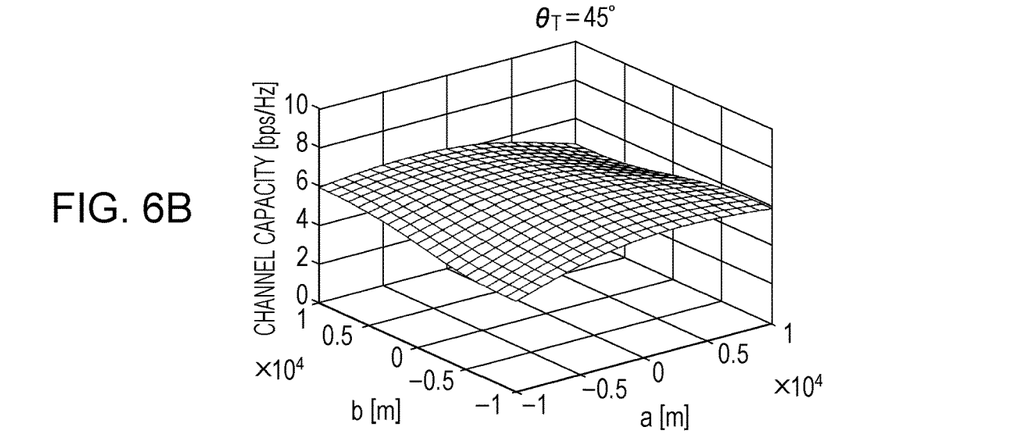
FIG. 6B is a diagram illustrating an example of a per-stream average channel capacity at a location of a mobile station when an antenna azimuth angle ($\theta_T$) of a base station is 45° according to an embodiment.
Figure 6C:
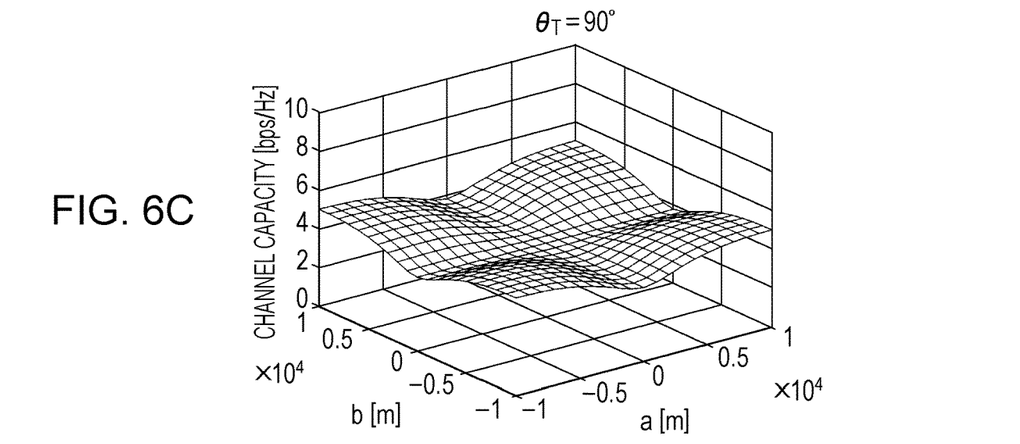
FIG. 6C is a diagram illustrating an example of a per-stream average channel capacity at a location of a mobile station when an antenna azimuth angle ($\theta_T$) of a base station is 90° according to an embodiment.

FIGS. 6A, 6B, and 6C illustrate examples of per-stream average channel capacities in eigenmode transmission in the LOS-MIMO transmission model.

FIG. 6A illustrate an example of a per-stream average channel capacity at the location of the mobile station 200 where azimuth angle $\theta_T = 0°$.

FIG. 6B illustrate an example of a per-stream average channel capacity at the location of the mobile station 200 where azimuth angle $\theta_T = 45°$.

FIG. 6C illustrate an example of a per-stream average channel capacity at the location of the mobile station 200 where azimuth angle $\theta_T = 90°$.

As shown in FIGS. 6A, 6B, and 6C, even when the location the mobile station 200 does not change, the per-stream average channel capacity changes depending on the azimuth angle $\theta_T$.

Figure 7:
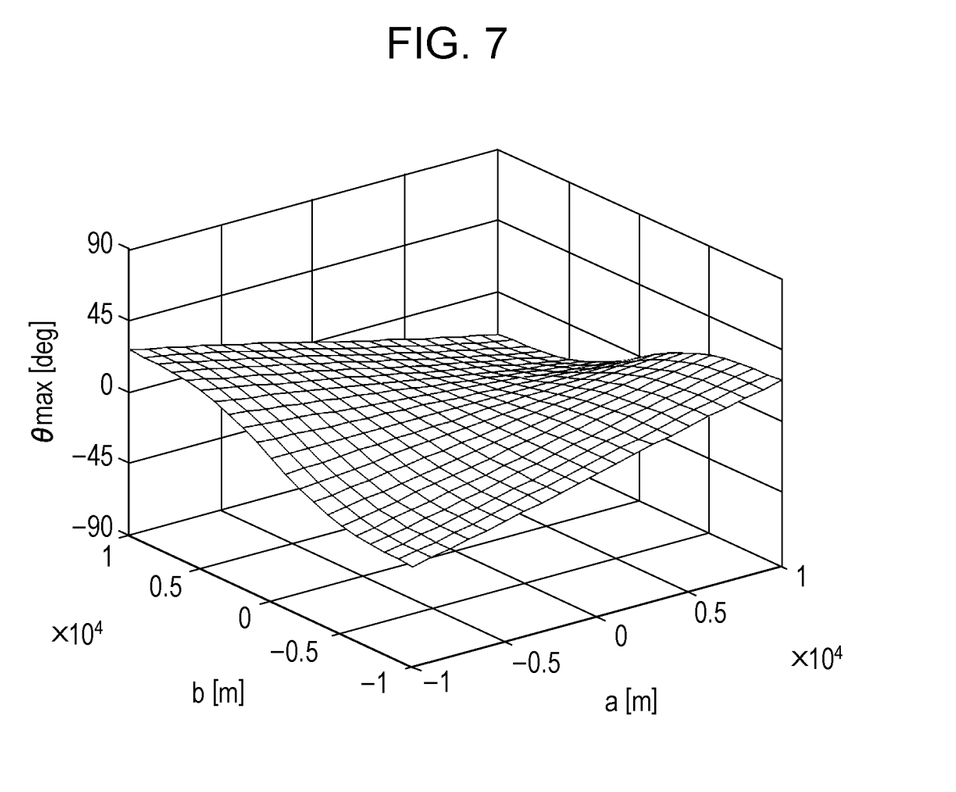
FIG. 7 is a diagram illustrating an example of an antenna azimuth angle ($\theta$max) at which a per-stream average channel capacity has a maximum value as a function of the location of a mobile station according to an embodiment.

FIG. 7 illustrates an azimuth angle $\theta_T=\theta\max$ at which a maximum per-stream average channel capacity is obtained when $\theta_T$ is changed in the range from $-180°\leq\theta_T\leq+180°$ for each of various locations of the mobile station 200.

As shown in FIG. 7, $\theta\max$ changes depending on the location of the mobile station 200. Note that in FIGS. 6A, 6B, and 6C and FIG. 7, the base station 100 is located at coordinates a=b=0. Also note that in FIGS. 6A, 6B, and 6C and FIG. 7, the mobile station 200 moves, for example, in a direction from the lower right to the upper left while maintaining the coordinate c at a fixed value (for example, c=10000 m). In other words, the mobile station 200 moves in a direction in which the value of the coordinate a and the value of the coordinate b increase.

For example, the mobile station 200 may move in a direction in which "b" increases (in the positive direction along the Y-axis in FIG. 4) while maintaining "a" at a fixed value (for example, at a=−10000 m). When b=10000 m is reached, "a" is increased (for example, to a=−9000 m), and the mobile station 200 moves in a direction in which "b" increases. By repeating the above-described operation on the coordinates until a=10000 m, it is possible to achieve the movement of the mobile station 200.

Figure 8:
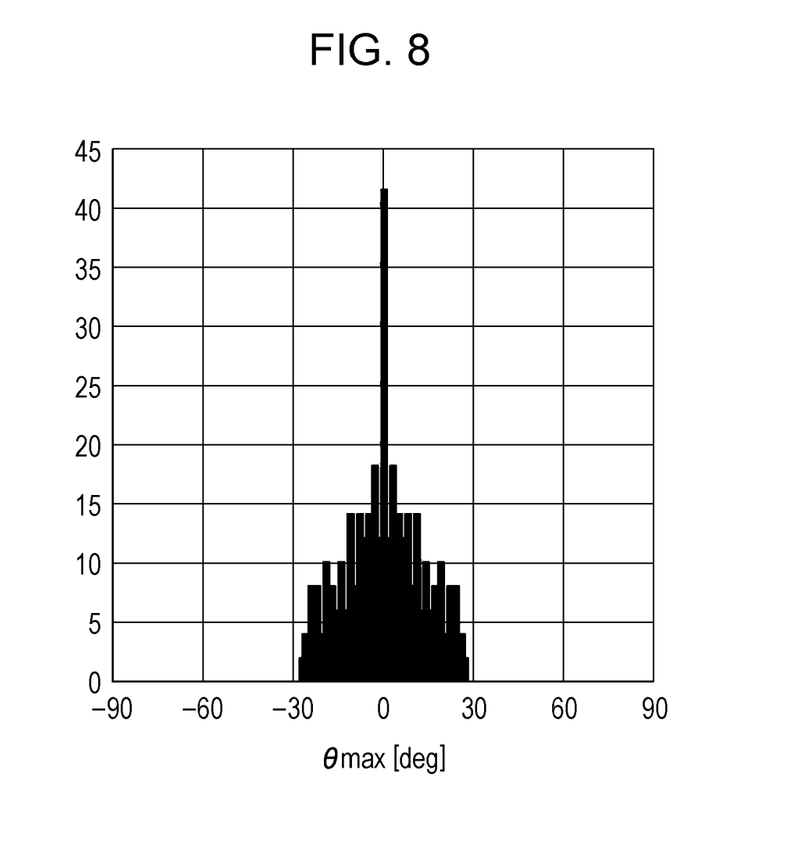
FIG. 8 is a diagram illustrating an example of a histogram in terms of the antenna azimuth angle ($\theta$max) shown in FIG. 7.

FIG. 8 is a diagram illustrating an example of a histogram in terms of $\theta\max$ shown in FIG. 7. As seen from FIG. 8, it can be seen that the distribution tends to have a narrow and steep peak near $\theta\max=0°$. In the LOS-MIMO transmission model shown in FIG. 4, $\theta_R=0°$, and thus it tends that when a condition $\theta_T\approx\theta_R$ or $\theta_T\approx\theta_R$ is met, the per-stream average channel capacity has a maximum value.

The above-described discussion indicates that the channel capacity may be improved with a simple configuration and/or by a simple control process, for example, by following two methods.

For example, the Y-axis in FIG. 4 is read as a meridian passing through the base station 100, and the direction of the Y-axis is taken in the north direction of the meridian. In the real world, the mobile station 200 such as an aircraft moves in various directions, and thus $\theta_R=0°$ is not necessarily met.

In a first method, the base station 100 controls the rotation angle of the rotation unit 104 thereby controlling the relative direction between the transmitting and receiving antennas, for example, based on the direction of travelling of the mobile station 200 (for example, the azimuth angle $\theta_R$) obtained from the mobile station information 106.

Figure 9:
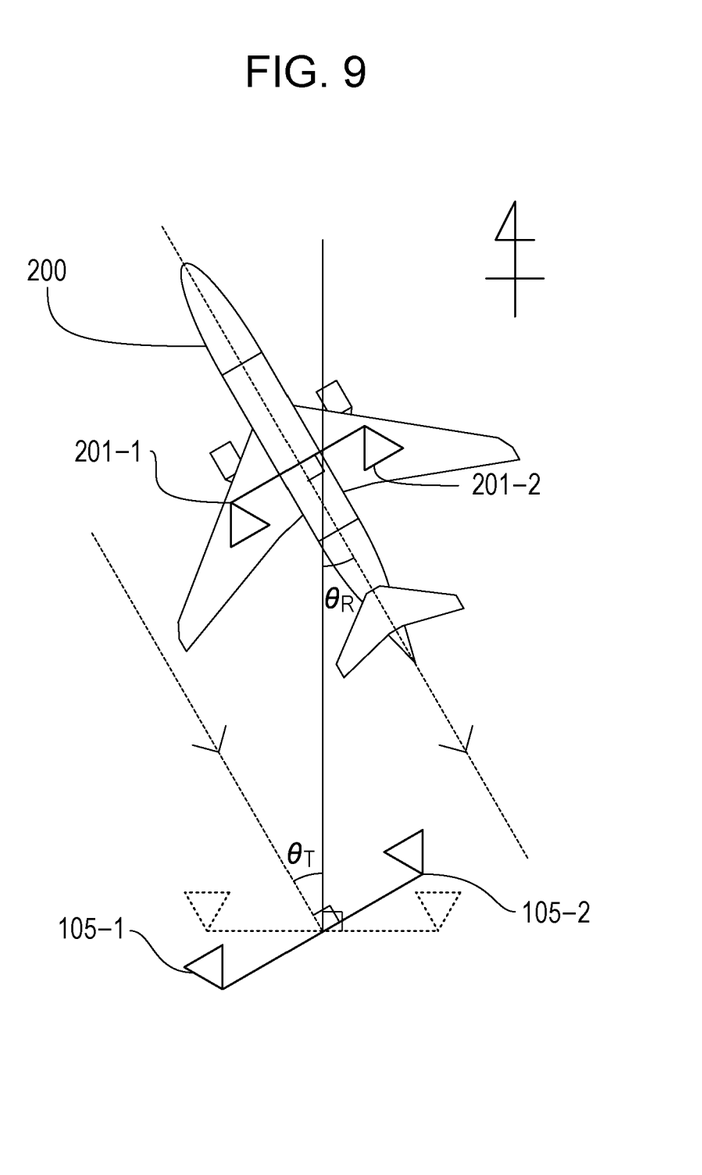
FIG. 9 is a diagram illustrating an example of a manner of setting an antenna azimuth angle of a mobile station according to an embodiment.

For example, as shown in FIG. 9, the rotation angle of the rotation unit 104 is controlled such that a straight line connecting the transmitting antennas 105-1 and 105-2 and a straight line connecting the receiving antennas 201-1 and 201-2 of the mobile station 200 are parallel to each other (for example, $\theta_T=\theta_R$) or substantially parallel to each other (for example, $\theta_T\approx\theta_R$).

In a second method, for example, making use of the fact that the per-stream average channel capacity changes repeatedly at intervals of 180° of $\theta_T$, the rotation unit 104 is rotated, for example, at a fixed rate such that the transmitting antennas 105-1 and 105-2 are continuously rotated.

In the second method, if the rotation speed of the rotation unit 104 is too low, there is a possibility that a reduction in channel capacity occurs over a long time duration, which may cause communication to have a problem. To handle the above situation, for example, a maximum allowable value may be set in terms of the time duration in which a continuous reduction in the channel capacity occurs (hereinafter referred to as a "continuous reduction time duration"), and the rotation speed of the rotation unit 104 is determined such that the continuous reduction time duration does not exceed the maximum allowable value.

Figure 10:
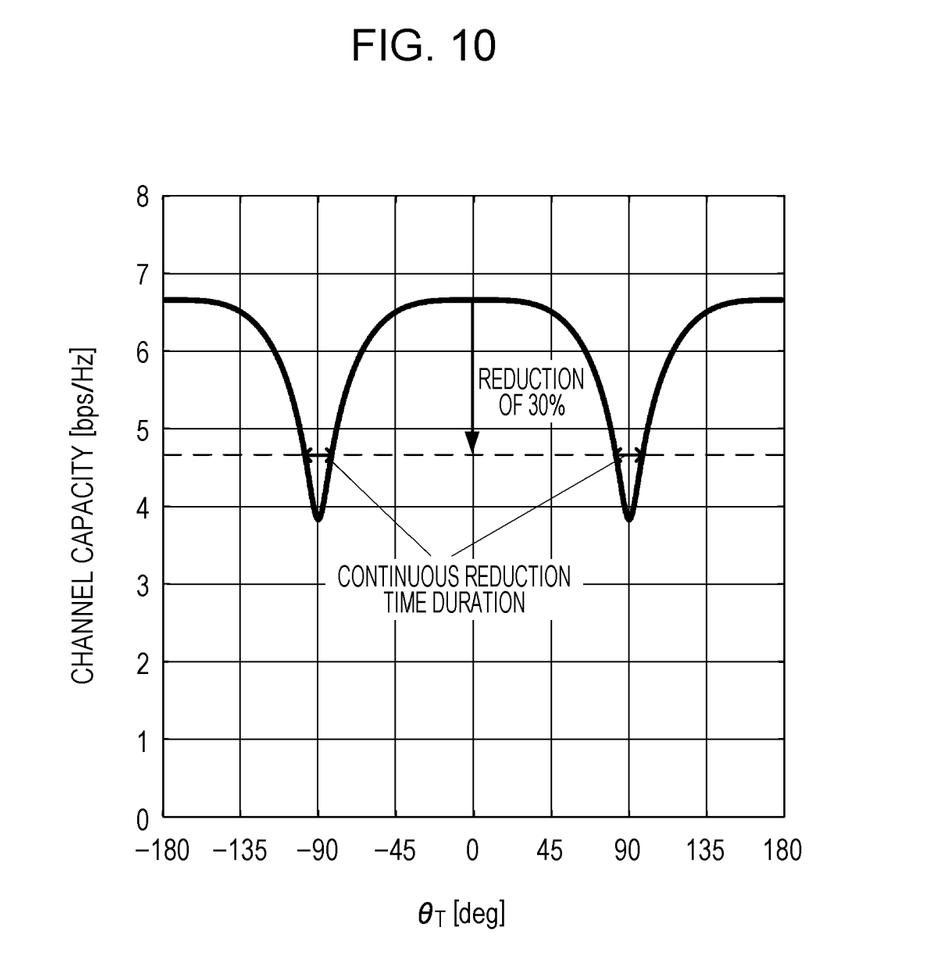
FIG. 10 is a diagram illustrating an example of a per-stream average channel capacity as a function of an antenna azimuth angle ($\theta_T$) of a base station according to an embodiment.

FIG. 10 is a diagram illustrating an example of a per-stream average channel capacity taken over a 20 km square shown in FIG. 6, in which a vertical axis represents the value of the per-stream average channel capacity.

For example, if the continuous reduction time duration is defined by a time duration in which the channel capacity is continuously lower than a capacity threshold value (for example, 70% of the maximum channel capacity) with respect to the maximum channel capacity, then, in the example shown in FIG. 10, a continuous reduction time duration occurs in an angle range of 15.4° in which $-97.7°\leq\theta_T<-82.3°$ and also in an angle range of 15.4° in which $82.3°\leq\theta_T<97.7°$.

Therefore, in a case where the allowable upper limit of the continuous reduction time duration is, for example, 0.1 sec, the rotation speed of the rotation unit 104 is set to be greater than or equal to 15.4°/0.1 sec=154°/sec (referred to as a threshold speed).

As examples of methods of achieving an improvement in the average channel capacity, the first method and the second method have been described above. Next, an example of a manner of setting the rotation angle of the rotation unit 104 so as to maximize the per-stream average channel capacity is described below.

Figure 11:
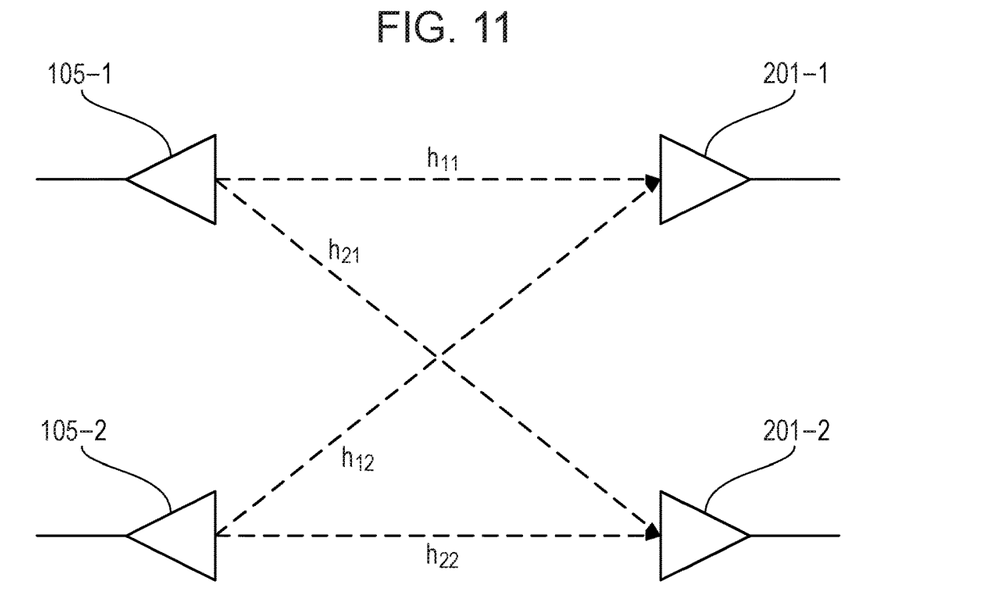
FIG. 11 is a diagram illustrating an example of a model of transmission between transmitting and receiving antennas according to an embodiment.

As shown in FIG. 11, a channel matrix H between the base station 100 and the mobile station 200 can be represented by formula (3) shown below.

$$H = \begin{bmatrix} h_{11} & h_{12} \\ h_{21} & h_{22} \end{bmatrix} = \begin{bmatrix} 1 & e^{-j\frac{\alpha_{12}}{180}\pi} \\ e^{-j\frac{\alpha_{21}}{180}\pi} & e^{-j\frac{\alpha_{22}}{180}\pi} \end{bmatrix} \quad (3)$$

In formula (3), $\alpha_{ki}$ (in units of degrees) represents a phase difference between a channel directed from the transmitting antenna 105-1 to the receiving antenna 201-1 and a channel from a transmitting antenna 105-$i$ to a receiving antenna 201-$k$, where i=1 or 2, k=1 or 2, and $\alpha_{11}=0°$.

The channel matrix H can be decomposed by singular value decomposition using unitary matrices U and V as described in formula (4) shown below.

$$H = USV^H \quad (4)$$

From formula (4), a diagonal matrix S is determined as described in formula (5) shown below, where elements $s_1$ and $s_2$ of a diagonal matrix S correspond to eigenvalues.

$$S = \begin{bmatrix} s_1 & 0 \\ 0 & s_2 \end{bmatrix} = \begin{bmatrix} \sqrt{2 + \sqrt{2 + 2\cos\left(\frac{\alpha_{12} + \alpha_{21} - \alpha_{22}}{180}\pi\right)}} & 0 \\ 0 & \sqrt{2 - \sqrt{2\cos\left(\frac{\alpha_{12} + \alpha_{21} - \alpha_{22}}{180}\pi\right)}} \end{bmatrix} \quad (5)$$

As described above, in the eigenmode transmission, signals are transmitted as if a plurality of orthogonal channels existed in space. The signal-to-noise ratio (SNR) of each channel is proportional to the eigenvalues $s_1$ and $s_2$, and the channel capacity C is given by formula (6) using SNR.

$$C = \log_2(1+SNR) \tag{6}$$

Thus, the per-stream average channel capacity can be maximized by determining $\theta_T$ that results in maximization of the average value of the eigenvalues $s_1$ and $s_2$. Because the eigenvalue $s_1$ and the eigenvalue $s_2$ are both positive, determining the value of $\theta_T$ that results in maximization of the average value of the eigenvalue $s_1$ and the eigenvalue $s_2$ is equivalent to determining the value of $\theta_T$ that results in maximization of $(s_1+s_2)^2$ in formula (7) shown below.

$$(s_1+s_2)^2 = s_1^2 + 2s_1 s_2 + s_2^2 = 2 + \sqrt{2 + 2\cos\left(\frac{\alpha_{12}+\alpha_{21}-\alpha_{22}}{180}\pi\right)} + \tag{7}$$

$$2\sqrt{2 + \sqrt{2 + 2\cos\left(\frac{\alpha_{12}+\alpha_{21}-\alpha_{22}}{180}\pi\right)}}$$

$$\sqrt{2 - \sqrt{2 + 2\cos\left(\frac{\alpha_{12}+\alpha_{21}-\alpha_{22}}{180}\pi\right)}} +$$

$$2 - \sqrt{2 + 2\cos\left(\frac{\alpha_{12}+\alpha_{21}-\alpha_{22}}{180}\pi\right)} =$$

$$4 + 2\sqrt{2 - 2\cos\left(\frac{\alpha_{12}+\alpha_{21}-\alpha_{22}}{180}\pi\right)}$$

From formula (7), it can be seen that $(s_1+s_2)^2$ has a maximum value when formula (8) shown below is satisfied, that is, formula (9) shown below is satisfied.

$$\cos\left(\frac{\alpha_{12}+\alpha_{21}-\alpha_{22}}{180}\pi\right) = -1 \tag{8}$$

$$|\alpha_{12}+\alpha_{21}-\alpha_{22}| = 180° + 360° \times N \tag{9}$$

In formula (9), N is an integer. In the following discussion, for simplicity, it is assumed that N=0, that is, $|\alpha_{12}+\alpha_{21}-\alpha_{22}|=180°$.

$\alpha_{ki}$ can be represented as a function of the antenna azimuth angle $\theta_T$ of the base station 100, the antenna azimuth angle $\theta_R$ of the mobile station 200, and coordinates (x, y, z). Therefore, formula (9) can be rewritten as formula (10) shown below.

$$f(\theta_T,\theta_R,x,y,z)=180-|\alpha_{12}(\theta_T,\theta_R,x,y,z)+\alpha_{21}(\theta_T,\theta_R,x,y,z)-\alpha_{22}(\theta_T,\theta_R,x,y,z)| \tag{10}$$

In the present embodiment, $D_T$ and $D_R$ are fixed at constant values, and thus, in a situation in which the transmitting antennas and the receiving antennas are located just opposite each other, $f(\theta_T,\theta_R, x, y, z)=0$ is met.

The transmitting antennas and the receiving antennas are just opposite each other, for example, in a case where the transmitting antennas 105-1 and 105-2 and the receiving antennas 201-1 and 201-2 are respectively disposed at vertices of a rectangle with a long-side length of c and a short-side length of $D_T$ or $D_R$. Formula (11) shown below holds for a relative position between another base station 100 and the mobile station 200.

$$f(\theta_T,\theta_R,x,y,z) > 0 \tag{11}$$

Therefore, to maximize the per-stream average channel capacity depending on the location of the mobile station 200, the azimuth angle $\theta_R$ and the coordinates (x, y, z) of the mobile station 200 obtained from the mobile station information 106 are substituted into formula (11), and $\theta_T$ is determined at which the $f(\theta_T, \theta_R, x, y, z)$ has a minimum value. The rotation angle of the rotation unit 104 is set to the determined value of $\theta_T$. To determine a condition in which the $f(\theta_T, \theta_R, x, y, z)$ has a minimum value, for example, a gradient method may be used.

In the embodiment, as described above, at the base station 100, based on the information indicating the direction of movement of the mobile station 200, the direction of the set of the transmitting antennas 105-1 and 105-2 is rotated with respect to the direction of the set of the receiving antennas 201-1 and 201-2 disposed on the mobile station 200 such that the receiving antennas 201-1 and 201-2 are symmetric with respect to the direction of movement of the mobile station 200.

This suppresses a reduction in the channel capacity between transmitting and receiving antennas in the LOS-MIMO communication. Thus, for example, in the LOS-MIMO communication between an aircraft (the mobile station 200) and a ground station or a sea station (the base station 100), it is possible to provide a stable communication for the aircraft flying in various directions.

Modifications

Instead of physically (or mechanically) rotating the transmitting antennas 105-1 and 105-2 by rotating the rotary unit 1041 in the above-described manner, the transmitting antennas 105-1 and 105-2 may be electronically rotated.

Figure 12:
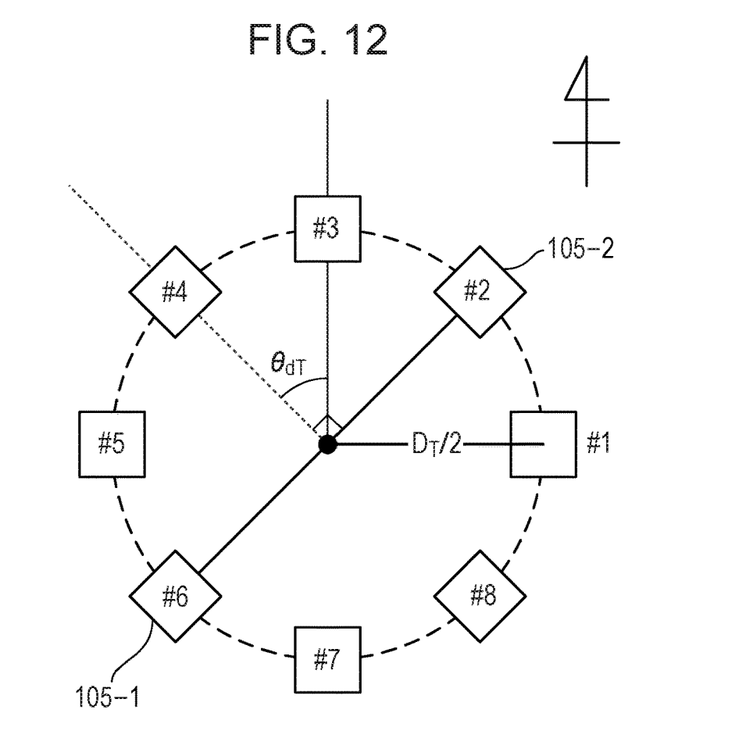
FIG. 12 is a diagram illustrating an example of a manner of rotating an antenna azimuth angle using am array antenna according to an embodiment.

For example, the direction of the transmitting antennas 105-1 and 105-2 with respect to the receiving antennas 201-1 and 201-2 may be rotated electronically. For example, as shown in FIG. 12, a plurality of pairs of transmitting antennas (for example, 4 pairs) are disposed along a circumference of a circle with a radius $D_T/2$ such that transmitting antennas of each pair (for example, a pair of transmitting antennas #1 and #5) are at locations symmetric about the center of the circle.

Transmitting antennas of each pair of transmitting antennas may correspond to the transmitting antennas 105-1 and 105-2. For example, a pair of transmitting antennas #1 and #5, a pair of transmitting antennas #2 and #6, a pair of transmitting antennas #3 and #7, and a pair of transmitting antennas #4 and #8 may each correspond to the pair of transmitting antennas 105-1 and 105-2.

Let azimuth angle $\theta_{dT}$ denote an angle between a perpendicular bisector, in the XY-plane, of a line segment connecting the transmitting antennas 105-1 and 105-2 and the north direction of a meridian. A pair of transmitting antennas is selected such that $\theta_{dT}=\theta_R$ or $\theta_{dT} \approx \theta_R$.

Alternatively, for example, the pair of transmitting antennas used (or operated) is switched at fixed time intervals while rotating all transmitting antennas in a fixed rotation direction. For example, the pair of transmitting antennas used in operation is switched at time intervals in the order a pair of transmitting antennas #1 and #5, a pair of transmitting antennas #2 and #6, a pair of transmitting antennas #3 and #7, and a pair of transmitting antennas #4 and #8.

Alternatively, $\theta_T$ may be determined at which $f(\theta_T, \theta_R, x, y, z)$ in formula (10) has a minimum value, and a pair of transmitting antennas may be selected such that $\theta_{dT}$ is closest to the determined value of $\theta_T$.

By electronically rotating the antenna direction in the above-described manner, it is possible, for example, to enhance the response speed in controlling the antenna direction compared with the case in which the antenna direction is rotated physically or mechanically. Thus, for example, it is possible to enhance the tracking performance of the control of the antenna direction so as to better track the movement of the mobile station 200, which results in an improvement in stability of LOS-MIMO communication between the base station 100 and the mobile station 200.

In the case where the antenna direction is electronically rotated, the resolution of the rotation angle can be increased by increase the number of antennas. On the other hand, in the case where the antenna direction is mechanically rotated, it is possible to achieve a higher resolution of the rotation angle with a smaller number of antennas than the number of antennas necessary to achieve a similar resolution of the rotation angle by electronically rotating the antenna direction. Therefore, in the selection as to whether the antenna direction is to be electronically or mechanically rotated, a tradeoff may occur, for example, between the achieved resolution depending on the number of antennas and the cost for the drive circuit or the mechanism used to drive and control the rotation.

In the embodiments and the modifications described above, the "receiving antennas" 201-1 and 201-2 of the mobile station 200 may be read as "transmitting antennas", and the "transmitting antennas" 105-1 and 105-2 of the base station 100 may be read as "receiving antennas".

In other words, in the LOS-MIMO transmission in a direction (downlink (DL)) from the base station 100 to the mobile station 200, the antennas 105-1 and 105-2 of the base station 100 function as transmitting antennas, while the antennas 201-1 and 201-2 of the mobile station 200 function as receiving antennas.

On the other hand, in the LOS-MIMO transmission in a direction (uplink (UL)) from the mobile station 200 to the base station 100, the antennas 201-1 and 201-2 of the mobile station 200 function as transmitting antennas, while the antennas 105-1 and 105-2 of the base station 100 function as receiving antennas.

Embodiments of the present disclosure have been described above with reference to drawings. However, the present disclosure is not limited to these embodiments. It will be apparent to those skilled in the art that many various modifications or changes may be applicable to the embodiments without departing from the spirit and scope of the present disclosure. Furthermore, constituent elements of different embodiments may be combined. Any resultant combination also falls within the scope of the present disclosure.

In the embodiments described above, it is assumed by way of example that the present disclosure is implemented using hardware. However, the present disclosure may be implemented using software in cooperation with hardware.

Each functional block according to the embodiments described above may be typically realized by an integrated circuit such as an LSI (Large Scale Integration) circuit having an input terminal and an output terminal. Each of the functional blocks may be formed individually on one chip, or part or all of the functional blocks may be formed on one chip. The system LSI may also be referred to as an IC, an LSI circuit, a super LSI circuit, or an ultra LSI circuit depending on the degree of integration.

Furthermore, the technique of implementing the integrated circuit is not limited to the LSI, but the integrated circuit may be realized in the form of a dedicated circuit or a general-purpose processor. The integrated circuit may also be realized using an FPGA (Field Programmable Gate Array) that can be programmed after the manufacture of the LSI or a reconfigurable processor that is allowed to be reconfigured in terms of the connection or the setting of circuit cells in the inside of the LSI.

When a new integration circuit technique other than LSI techniques are realized in the future by an advance in semiconductor technology or related technology, the functional blocks may be realized using such a new technique. A possible example of a new technique is biotechnology.

Summary of the Present Disclosure

In an aspect, the present disclosure provides a base station including a first antenna and a second antenna disposed at locations symmetric with respect to a symmetry axis, and an antenna rotation mechanism that rotates, based on information indicating a direction of movement of a mobile station, a direction of a set of the first antenna and the second antenna with respect to a direction of a set of a third antenna and a fourth antenna disposed on the mobile station, the third antenna and the fourth antenna being at locations symmetric with respect to the direction of movement of the mobile station.

In the base station according to the aspect of the present disclosure, the antenna rotation mechanism may rotate the set of the first antenna and the second antenna about the symmetry axis taken as a rotation axis.

In the base station according to the aspect of the present disclosure, the antenna rotation mechanism may set a rotation angle of the set of the first antenna and the second antenna to a rotation angle at which a minimum value is obtained in terms of a difference between a first azimuth angle and a second azimuth, the first azimuth angle being defined by an angle, with respect to a reference azimuth, of a perpendicular bisector of a line segment connecting, in a horizontal plane, the first antenna and the second antenna, the second azimuth angle being defined by an angle, with the reference azimuth, of the direction of movement in the horizontal plane.

In the base station according to the aspect of the present disclosure, the antenna rotation mechanism may rotate the set of the first antenna and the second antenna at a rotation speed greater than or equal to a speed threshold.

In the base station according to the aspect of the present disclosure, the speed threshold may be determined based on a time period during which an average channel capacity between the first and second antennas and the third and fourth antennas is continuously smaller than or equal to a capacity threshold value.

In the base station according to the aspect of the present disclosure, minimizing the difference between the first azimuth angle and the second azimuth is equivalent to minimizing 180°−(a first phase difference+a second phase difference−a third phase difference), where the first phase difference is a phase difference between a first channel directed from the first antenna to the third antenna and a second channel directed from the second antenna to the third antenna, the second phase difference is a phase difference between the first channel and a third channel directed from the first antenna to the fourth antenna, and the third phase difference is a phase difference between the first channel and a fourth channel directed from the second antenna to the fourth antenna.

In the base station according to the aspect of the present disclosure, the antenna rotation mechanism may include a rotary unit rotatable about a rotation axis given by the symmetry axis, and the first antenna and the second antenna may be disposed on the rotary unit, and the center of a line segment connecting the first antenna and the second antenna may be coincident with the rotation axis.

In the base station according to the aspect of the present disclosure, the antenna rotation mechanism may include a plurality of antennas disposed along a circumference of a circle whose center is at a location coincident with the symmetry axis, and the antenna rotation mechanism may select a pair of antennas at locations corresponding to a diameter of the circle from the plurality of antennas disposed along the circumference and may employ the selected pair of antennas as the set of the first and second antennas.

In the base station according to the aspect of the present disclosure, the selecting of the set of the first and second antennas may include selecting, in a time-division manner, a different pair of antennas at locations corresponding to a diameter of the circle.

In an aspect, the present disclosure provides an antenna control method including acquiring, at a base station having a first antenna and a second antenna disposed at locations symmetric with respect to a symmetry axis, information indicating a direction of movement of a mobile station, and rotating, based on the information indicating the direction of movement, a direction of a set of the first antenna and the second antenna with respect to a direction of a set of a third antenna and a fourth antenna disposed on the mobile station, the third antenna and the fourth antenna being at locations symmetric with respect to the direction of movement of the mobile station.

The present disclosure is applicable to a wireless communication system, and more specifically, for example, to a mobile communication system in which LOS-MIMO transmission is performed between a base station and a mobile station.

What is claimed is:

1. A base station comprising:
a first antenna and a second antenna disposed at locations symmetric with respect to a symmetry axis; and
an antenna rotation mechanism that rotates, based on information indicating a direction of movement of a mobile station, a direction of a set of the first antenna and the second antenna with respect to a direction of a set of a third antenna and a fourth antenna disposed on the mobile station, the third antenna and the fourth antenna being at locations symmetric with respect to the direction of movement of the mobile station.

2. The base station according to claim 1, wherein the antenna rotation mechanism rotates the set of the first antenna and the second antenna about the symmetry axis taken as a rotation axis.

3. The base station according to claim 2, wherein the antenna rotation mechanism sets a rotation angle of the set of the first antenna and the second antenna to a rotation angle at which a minimum value is obtained in terms of a difference between a first azimuth angle and a second azimuth angle, the first azimuth angle being defined by an angle, with respect to a reference azimuth, of a perpendicular bisector of a line segment connecting, in a horizontal plane, the first antenna and the second antenna, the second azimuth angle being defined by an angle, with the reference azimuth, of the direction of movement in the horizontal plane.

4. The base station according to claim 3, wherein
minimizing the difference between the first azimuth angle and the second azimuth angle is equivalent to minimizing 180°−(a first phase difference+a second phase difference−a third phase difference),
where the first phase difference is a phase difference between a first channel directed from the first antenna to the third antenna and a second channel directed from the second antenna to the third antenna,
the second phase difference is a phase difference between the first channel and a third channel directed from the first antenna to the fourth antenna, and
the third phase difference is a phase difference between the first channel and a fourth channel directed from the second antenna to the fourth antenna.

5. The base station according to claim 1, wherein the antenna rotation mechanism rotates the set of the first antenna and the second antenna at a rotation speed greater than or equal to a speed threshold.

6. The base station according to claim 5, wherein the speed threshold is determined based on a time period during which an average channel capacity between the first and second antennas and the third and fourth antennas is continuously smaller than or equal to a capacity threshold value.

7. The base station according to claim 1, wherein
the antenna rotation mechanism includes a rotary unit rotatable about a rotation axis given by the symmetry axis,
the first antenna and the second antenna are disposed on the rotary unit, and
the center of a line segment connecting the first antenna and the second antenna is coincident with the rotation axis.

8. The base station according to claim 1, wherein
the antenna rotation mechanism includes a plurality of antennas disposed along a circumference of a circle whose center is at a location coincident with the symmetry axis, and
the antenna rotation mechanism selects a pair of antennas at locations corresponding to a diameter of the circle from the plurality of antennas disposed along the circumference and employs the selected pair of antennas as the set of the first and second antennas.

9. The base station according to claim 8, wherein the selecting of the set of the first and second antennas includes selecting, in a time-division manner, a different pair of antennas at locations corresponding to a diameter of the circle.

10. An antenna control method comprising:
acquiring, at a base station having a first antenna and a second antenna disposed at locations symmetric with respect to a symmetry axis, information indicating a direction of movement of a mobile station; and
rotating, based on the information indicating the direction of movement, a direction of a set of the first antenna and the second antenna with respect to a direction of a set of a third antenna and a fourth antenna disposed on the mobile station, the third antenna and the fourth antenna being at locations symmetric with respect to the direction of movement of the mobile station.

* * * * *